(12) United States Patent
Bercaw et al.

(10) Patent No.: US 8,067,654 B2
(45) Date of Patent: Nov. 29, 2011

(54) TRANSITION METAL CATALYSTS

(75) Inventors: John E Bercaw, Pasadena, CA (US); Paul Richard Elowe, Pasadena, CA (US); Stefan Klaus Spitzmesser, Brussels (BE)

(73) Assignee: Ineos Europe Limited, Hampshire (GB)

( * ) Notice: Subject to any disclaimer, the term of this patent is extended or adjusted under 35 U.S.C. 154(b) by 991 days.

(21) Appl. No.: 11/700,954

(22) Filed: Feb. 1, 2007

(65) Prior Publication Data
US 2007/0185363 A1 Aug. 9, 2007

(30) Foreign Application Priority Data
Feb. 3, 2006 (EP) .................................. 06250599

(51) Int. Cl.
*C07C 2/08* (2006.01)
*C07C 2/32* (2006.01)
*C07C 2/36* (2006.01)
*B01J 31/18* (2006.01)
*B01J 31/24* (2006.01)

(52) U.S. Cl. ......... 585/513; 502/103; 502/162; 502/167

(58) Field of Classification Search .................. 585/513; 502/103, 162, 167
See application file for complete search history.

(56) References Cited

U.S. PATENT DOCUMENTS 7,511,183 B2 * 3/2009 Blann et al. .................. 585/513
7,525,009 B2 * 4/2009 Blann et al. .................. 585/527

FOREIGN PATENT DOCUMENTS

| WO | WO 02/04119 A | | 1/2002 |
| WO | WO 2004/056477 | * | 7/2004 |
| WO | WO 2004/056479 A | | 7/2004 |

OTHER PUBLICATIONS

Gaw, Kristy G., et al; "Molybdenum(0), ruthenium(II), palladium(II), platinum(II), copper (I) and gold(I) complexes of a new methoxy functionalised bis(phosphino)amine: synthesis and structure"; *New Journal of Chemistry*, vol. 24(6), pp. 429-435 (2000) XP-002412703.

Slawin, Alexandra M.Z., et al; "Novel chiral phosphine ligands and complexes from amino acid esters"; *J. Chem. Soc., Dalton Trans.*, vol. 5, pp. 621-632 (2001) XP-002412704.

Badia, Angel, et al; "Synthesis and structure of $Pd^{II}$ and $Pt^{II}$ complexes containing chiral diphosphazane ligands"; *Journal of Organometallic Chemistry*, vol. 554(2), pp. 105-112 (1998).

* cited by examiner

*Primary Examiner* — Caixia Lu
(74) *Attorney, Agent, or Firm* — Nixon & Vanderhye

(57) ABSTRACT

Transition metal catalysts comprise
 (a) a source of a Group 3 to 10 transition metal,
 (b) a ligand having the formula:

$$R^1R^2X\text{—}Y\text{—}XR^3R^4$$

Figure 1:
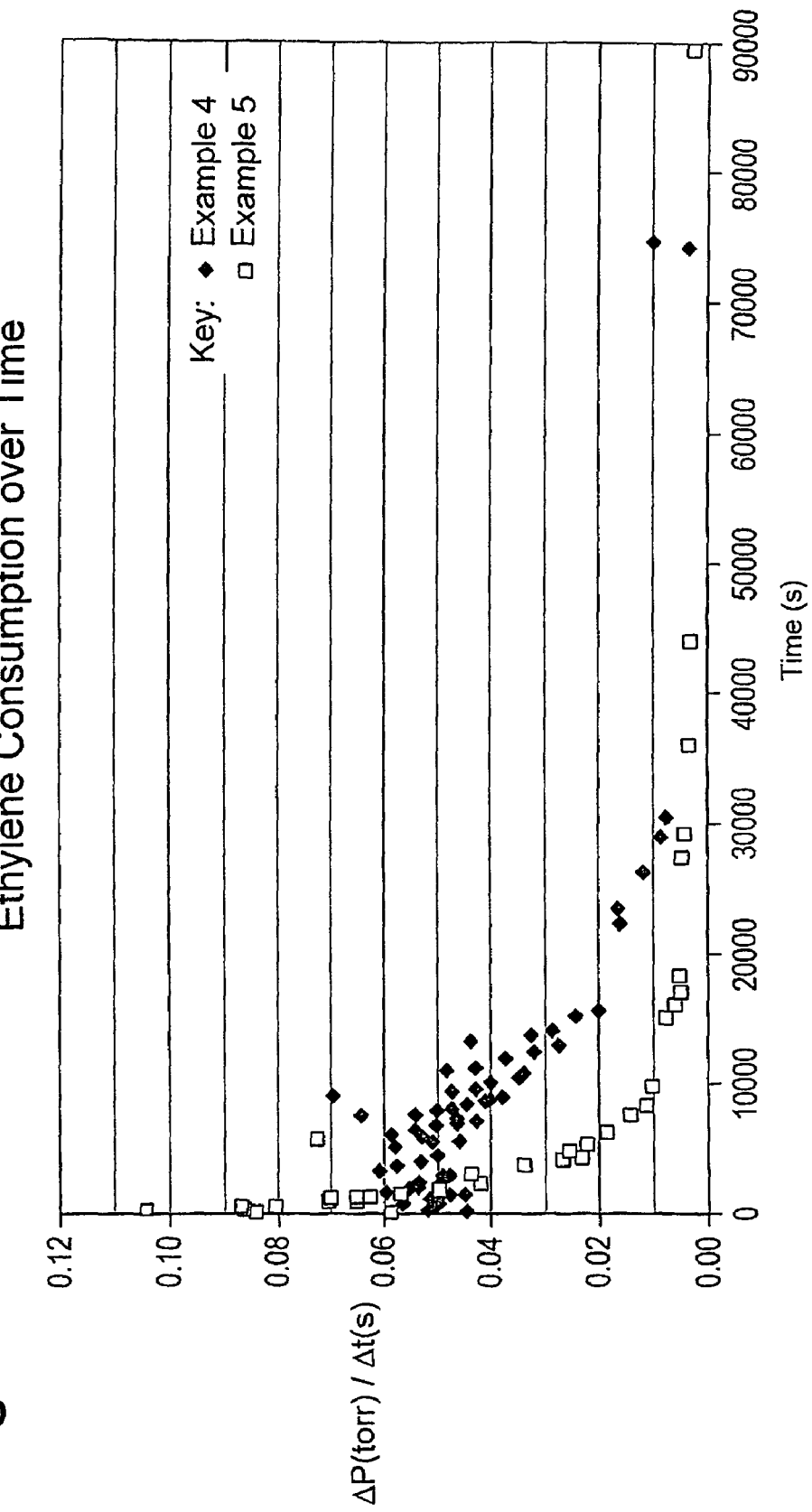

wherein
X is phosphorus, arsenic or antimony,
Y is a bridging group having the formula:

$$Z\text{-}(A)\text{-}D\text{-}R_m$$

wherein
 Z is the moiety linking the X groups,
 A is a linear or cyclic hydrocarbyl, substituted hydrocarbyl, heterohydrocarbyl or substituted heterohydrocarbyl linking group wherein the number of atoms directly linking Z to D is 1, 2 or 3,
 D is N, P, As, O, S or Se,
 R is hydrogen, alkyl, hydrocarbyl, substituted hydrocarbyl, heteroalkyl, heterohydrocarbyl or substituted heterohydrocarbyl, and
 m is 1 or 2,
$R^1$, $R^2$, $R^3$, and $R^4$ are the same or different and represent hydrocarbyl or functionalized hydrocarbyl moieties
with the proviso that if D is nitrogen, R is not a cyclic ether, and optionally an activator.
The transition metal catalysts are suitable for the selective trimerisation or tetramerisation of olefins in particular ethylene.

26 Claims, 1 Drawing Sheet

TRANSITION METAL CATALYSTS

The present invention relates to transition metal catalysts suitable for the trimerisation and tetramerisation of olefins and in particular to transition metal catalysts based on chromium metal compounds comprising diphosphine ligands.

U.S. Pat. No. 5,198,563 and related patents by Phillips describe chromium-containing catalysts containing monodentate amide ligands useful for trimerising olefins.

U.S. Pat. No. 5,968,866 discloses an ethylene oligomerisation/trimerisation process which uses a catalyst comprising a chromium complex which contains a coordinating asymmetric tridentate phosphane, arsane or stibane ligand (referred to therein as phospline, arsine or stibine, and representing a phosphorus, arsenic or antimony atom attached to three hydrocarbyl groups) and an aluminoxane to produce alpha-olefins which are enriched in 1-hexene. There is no suggestion that it is possible to replace any of the phosphane, arsane or stibane groups: indeed, it is impossible to predict what the effect of such a replacement would be.

Our earlier application WO 02/04119 describes catalysts for the trimerisation of olefins, comprising
(a) a source of chromium, molybdenum or tungsten;
(b) a ligand containing at least one phosphorus, arsenic or antimony atom bound to at least one hydrocarbyl- or heterohydrocarbyl group having a polar substituent, but excluding the case where all such polar substitutents are phosphane, arsane or stibane groups; and optionally
(c) an activator.

WO 04/056477 describes trimerisation catalysts comprising transition metal compounds and a heteroatomic ligand which does not contain electron donating substitutents.

WO 04/056478 describes a process for the selective tetramerisation of olefins using a catalyst comprising a transition metal compound and a heteroatomic ligand wherein the ligand contains at least one polar substitutent.

WO 04/056479 also describes a process for the selective tetramerisation of olefins using a catalyst comprising a transition metal compound and a heteroatomic ligand. Examples 8, 11 and 12 of this reference describe compounds having certain donor substitutents on the linking nitrogen atom of a phosphorus-nitrogen-phosphorus ligand.

Both of these later references relate to a process for the selective tetramerisation of olefins wherein the product stream of the process contains more than 30% of the tetramer olefin.

We have now surprisingly found that certain novel transition metal compounds having specifically located donor ligands may be used as catalyst components for the selective trimerisation and tetramerisation of olefins with an improved ratio of C8 versus C6 products and/or higher productivity. In addition the catalysts show an increased stability.

Thus according to a first aspect of the present invention there is provided a catalyst system for the selective trimerisation or tetramerisation of olefins, comprising
(a) a source of a Group 3 to 10 transition metal,
(b) a ligand having the formula:

$R^1R^2X—Y—XR^3R^4$ wherein
X is phosphorus, arsenic or antimony,
Y is a bridging group having the formula:

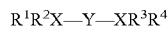

wherein
Z is methylene, 1,2-ethane, 1,2-phenylene, 1,3-propane, 1,2-catechol or nitrogen.

A is a linear or cyclic hydrocarbyl, substituted hydrocarbyl, heterohydrocarbyl or substituted heterohydrocarbyl linking group wherein the number of atoms directly linking Z to D is 1, 2 or 3,
D is N, P, As, O, S or Se,
R is hydrogen, alkyl, hydrocarbyl, substituted hydrocarbyl, heteroalkyl, heterohydrocarbyl or substituted heterohydrocarbyl, and
m is 1 or 2,
$R^1$, $R^2$, $R^3$, and $R^4$ are the same or different and represent hydrocarbyl or functionalized hydrocarbyl moieties with the proviso that if D is N then R is not a cyclic ether.
and optionally
(c) an activator.

For the avoidance of doubt in this application, cyclic ether may be represented by a cyclic moiety comprising an oxygen atom and in this context when D is nitrogen may be exemplified by a morpholino moiety.

The preferred hydrocarbyl moiety for $R^1$, $R^2$, $R^3$, and $R^4$ is phenyl.

The preferred ligands are those wherein X is phosphorus.
Examples of suitable linking groups A are $CH_2CH_2$, $(CH_2)_3$, $SiR_2$, NR, BR and similar.

Particularly preferred ligands are those wherein Z is nitrogen, A is hydrocarbyl and D is oxygen.

Examples of the preferred ligands are those wherein Y is

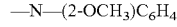

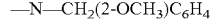

As regards the source of the Group 3 to 10 transition metal (a), this can include simple inorganic and organic salts, for example, halides, acetylacetonates, carboxylates, oxides, nitrates, sulfates and the like, as well as co-ordination and organometallic complexes, for example, chromium trichloride tetrahydrofuran complex, chromium dichloride tolyl tetrahydrofuran complex, (benzene)tricarbonylchromium, chromium hexacarbonyl, molybdenum hexacarbonyl and the like. Preferably component (a) is a source of a Group 6 transition metal i.e. chromium, molydenum or tungsten.

Particularly preferred is chromium.

Examples of compounds suitable as component (b) of the present invention include $(C_6H_5)_2PN(CH_2CH_2OCH_3)P(C_6H_5)_2$, $(C_6H_5)_2PN(CH_2CH_2CH_2OCH_3)P(C_6H_5)_2$, $(C_6H_5)_2PN((2-OCH_3)C_6H_4)P(C_6H_5)_2$ and $(C_6H_5)_2PN(CH_2(2-OCH_3)C_6H_4)P(C_6H_5)_2$. These compounds may be suitably prepare by conventional methods. For example $(C_6H_5)_2PN(CH_2CH_2OCH_3)P(C_6H_5)_2$ may be prepared from chlorodiphenylphosphine and methoxyethylamine.

The preparation of the catalysts of the present invention is further illustrated by the accompanying examples.

Components (a) and (b) may be present in any ratio, preferably between 10000:1 and 1:10000; more preferred is a ratio between 100:1 and 1:1100, and especially preferred is a ratio of 10:1 to 1:10, particularly 3:1 to 1:3. Generally the amounts of (a) and (b) are approximately equal, ie a ratio of between 1.5:1 and 1:1.5.

In this specification the term "tetramerisation" generally means the reaction of four and preferably four identical olefinic monomer units to yield a linear and/or branched olefin.

The present invention is particularly directed to a process for the tetramerisation of olefins to selectively yield tetrameric olefin products.

In this specification the term "trimerisation" generally means catalytic reaction of a single olefinic monomer or a mixture of olefinic monomers to give products enriched in those constituents derived from the reaction(s) of three olefinic monomers, as distinct from polymerisation or oligomerisation, which typically give olefinic product distributions governed by either a geometric series equation or following a Poisson pattern of distribution. "Trimerisation" includes the case where all the monomer units in the trimerisation product are identical, where the trimerization product is made from two different olefins (ie. two equivalents of one monomer react with one equivalent of a second monomer) and also where three different monomer units react to yield the product.

The activator compound (c) may in principle be any compound that generates an active catalyst with components (a) and (b). Mixtures of activators may also be used. Suitable compounds include organoaluminium compounds, organoboron compounds and inorganic acids and salts, such as tetrafluoroboric acid etherate, silver tetrafluoroborate, sodium hexafluoroantimonate and the like. Suitable organoaluminium compounds include compounds of the formula $AlR_3$, where each R is independently $C_1$-$C_{12}$ alkyl, oxygen or halide, and compounds such as $LiAlH_4$ and the like. Examples include trimethylaluminium (TMA), triethylaluminium (TEA), tri-isobutylaluminium (TIBA), tri-n-octylaluminium, methylaluminium dichloride, ethylaluminium dichloride, dimethylaluminium chloride, diethylaluminium chloride, ethylaluminiumsesquichloride, methylaluminium-sesquichloride, and alumoxanes. Alumoxanes are well known in the art as typically oligomeric compounds which can be prepared by the controlled addition of water to an alkylaluminium compound, for example trimethylaluminium. Such compounds can be linear, cyclic, cages or mixtures thereof. Commercially available alumoxanes are generally believed to be mixtures of linear and cyclic compounds. The cyclic alumoxanes can be represented by the formula $[R^6AlO]_s$ and the linear alumoxanes by the formula $R^7(R^8AlO)$, wherein s is a number from about 2 to 50, and wherein $R^6$, $R^7$, and $R^8$ represent hydrocarbyl groups, preferably $C_1$ to $C_6$ alkyl groups, for example methyl, ethyl or butyl groups. Alkylalumoxanes such as methylalumoxane (MAO) are preferred.

Mixtures of alkylalumoxanes and trialkylaluminium compounds are particularly preferred, such as MAO with TMA or TIBA. In this context it should be noted that the term "alkylalumoxane" as used in this specification includes alkylalumoxanes available commercially which may contain a proportion, typically about 10 wt %, but optionally up to 50 wt %, of the corresponding trialkylaluminium; for instance, commercial MAO usually contains approximately 10 wt % trimethylaluminium (TMA), whilst commercial MMAO contains both TMA and TIBA. Quantities of alkylalumoxane quoted herein include such trialkylaluminium impurities, and accordingly quantities of trialkylaluminium compounds quoted herein are considered to comprise compounds of the formula $AlR_3$ additional to any $AlR_3$ compound incorporated within the alkylalumoxane when present.

Examples of suitable organoboron compounds are boroxines, $NaBH_4$, trimethylboron, triethylboron, dimethylphenylammoniumtetra(phenyl)borate, tritytetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)_2$[(bis-3,5-trifluoromethyl)phenyl] borate, tritytetra(pentafluorophenyl)borate and tris(pentafluorophenyl) boron.

Activator compound (c) may also be or contain a compound that acts as a reducing or oxidising agent, such as sodium or zinc metal and the like, or oxygen and the like.

In the preparation of the catalysts utilised in the present invention, the quantity of activating compound to be employed is easily determined by simple testing, for example, by the preparation of small test samples which can be used to trimerise small quantities of the monomer(s) and thus to determine the activity of the produced catalyst. It is generally found that the quantity employed is sufficient to provide 0.1 to 20,000 atoms, preferably 1 to 2000 atoms of aluminium or boron per atom of chromium. In some cases, for particular combinations of component (a) and (b), an activating compound (c) may not be required.

The catalyst components (a), (b) and (c) utilised in the present invention can be unsupported or supported on a support material, for example, silica, alumina, $MgCl_2$ or zirconia, or on a polymer, for example polyethylene, polypropylene, polystyrene, or poly(aminostyrene).

A preferred support is silica.

If desired the catalysts can be formed in situ in the presence of the support material, or the support material can be pre-impregnated or premixed, simultaneously or sequentially, with one or more of the catalyst components. The quantity of support material employed can vary widely, for example from 100,000 to 1 grams per gram of metal present in the transition metal compound. In some cases, the support material can also act as or as a component of the activator compound (c). Examples include supports containing alumoxane moieties and/or hydrocarbyl boryl moieties (see, for example, Hlalky, G. G. *Chem. Rev.* 2000, 100, 1347.)

According to another aspect of the present invention there is provided a process for the trimerization or tetramerization of olefin monomer or olefin monomers said process performed in the presence of a catalyst system as hereinbefore described.

Suitable olefinic monomers, or combinations thereof for use in the processes of the present invention are hydrocarbon olefins, for example, ethylene, $C_{2-20}$ α-olefins, internal olefins, vinylidene olefins, cyclic olefins and dienes, propylene, 1-butene, 1-pentene, 1-hexene, 4-methylpentene-1,1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, styrene, 2-butene, 2-ethyl-1-hexene, cyclohexene, norbornene, butadiene and 1,5-hexadiene. Olefins with a polar functionality, such as methyl (meth)acrylate, vinyl acetate, α,ω-undecenol and the like, may also be used. The preferred monomer is ethylene. Mixtures of these monomers may also be used, for example a 1-butene unit and two ethylene units may be co-trimerised to form C8 olefins, or 1-hexene and ethylene co-trimerised to C10 olefins, or 1-dodecene and ethylene co-trimerised to C16 olefins. Combinations of these co-trimerisation reactions may be performed simultaneously, especially when one or more of the monomers are produced in situ (e.g. a mixture of ethylene and butene can be used to form mixtures containing predominantly hexenes, octenes, and decenes.) Techniques for varying the distribution of products from these reactions include controlling process conditions (e.g. concentration, reaction temperature, pressure, residence time) and properly selecting the design of the process and are well known to those skilled in the art.

Olefinic monomers or mixtures of olefinic monomers for trimerisation or tetramerisation may be substantially pure or may contain olefinic impurities.

Components (a)-(c) of the catalyst system utilised in the present invention may be added together simultaneously or sequentially, in any order, and in the presence or absence of monomer in any suitable solvent, so as to give an active catalyst. For example, components (a), (b) and (c) and monomer may be contacted together simultaneously, or components (a), (b) and (c) may be added together simultaneously or sequentially in any order and then contacted with monomer, or components a) and b) may be added together to form an isolable metal-ligand complex and then added to component c) and contacted with monomer, or components (a), (b) and (c) may be added together to form an isolable metal-ligand complex and then contacted with monomer. Suitable solvents for contacting the components of the catalyst or catalyst system include, but are not limited to, hydrocarbon solvents such as heptane, toluene, 1-hexene and the like, and polar solvents such as diethyl ether, tetrahydrofuran, acetonitrile, dichloromethane, chloroform, chlorobenzene, methanol, acetone and the like.

Applicants have also surprisingly found that in particular the use of halogen containing solvents, for example chlorobenzene or 1,2-dichlorobenzene, either alone or in combination with hydrocarbon co-solvents further improves catalyst stability and productivity and decreases polyethylene side product formation.

Solvent additives may also be used in the present invention. Suitable additives are those that stabilize and decrease polyethylene formation.

The trimerization/tetramerization catalysts of the present invention may be suitable employed in a solution, slurry or gas phase process.

When operating under solution or slurry phase conditions, any diluent or solvent that is an olefin, a mixture of olefins, or is substantially inert under trimerisation or tetramerisation conditions may be employed. Mixtures of inert diluents, with or without one or more olefins, also could be employed. The preferred diluents or solvents are aliphatic and aromatic hydrocarbons and halogenated hydrocarbons such as, for example, isobutane, pentane, toluene, xylene, ethylbenzene, cumene, mesitylene, heptane, cyclohexane, methylcyclohexane, 1-hexene, 1-octene, chlorobenzene, dichlorobenzene, and the like, and mixtures such as isopar.

The process conditions can be, for example, solution phase, slurry phase, gas phase or bulk phase, with temperatures ranging from −100° C. to +300° C., preferably from 0° C. to +300° C. and more preferably from 35° C. to 200° C., and at pressures of atmospheric and above, preferably from atmospheric to 800 barg and more preferably from 1 barg to 100 barg.

Irrespective of the technique employed, the process is typically carried out under conditions that substantially exclude oxygen, water, and other materials that act as catalyst poisons. Also, the process can be carried out in the presence of additives to control selectivity, enhance activity and reduce the amount of polymer formed. Suitable additives include, but are not limited to, hydrogen or a halide source such as $GeCl_4$. Exemplary halides include, but are not limited to fluoride, chloride, bromide, and/or iodide.

There exist a number of options for the reactor including batch, semi-batch, and continuous operation. The processes of the present invention can be performed under a range of conditions that are readily apparent to those skilled in the art: as a homogeneous liquid phase reaction in the presence or absence of an inert hydrocarbon diluent such as toluene or heptanes; as a two-phase liquid/liquid reaction; as a slurry process where the catalyst is in a form that displays little or no solubility; as a bulk process in which essentially neat reactant and/or product olefins serve as the dominant medium; as a gas-phase process in which at least a portion of the reactant or product olefin(s) are transported to or from a supported form of the catalyst via the gaseous state. Evaporative cooling from one or more monomers or inert volatile liquids is but one method that can be employed to effect the removal of heat from the reaction. The processes may be performed in the known types of gas-phase reactors, such as circulating bed, vertically or horizontally stirred-bed, fixed-bed, or fluidised-bed reactors, liquid-phase reactors, such as plug-flow, continuously stirred tank, or loop reactors, or combinations thereof. A wide range of methods for effecting product, reactant, and catalyst separation and/or purification are known to those skilled in the art and may be employed: distillation, filtration, liquid-liquid separation, slurry settling, extraction, etc. One or more of these methods may be performed separately from the tetramerisation reaction or it may be advantageous to integrate at least some with a trimerisation or tetramerisation reaction; a non-limiting example of this Would be a process employing catalytic (or reactive) distillation. Also advantageous may be a process which includes more than one reactor, a catalyst kill system between reactors or after the final reactor, or an integrated reactor/separator/purifier. While all catalyst components, reactants, inerts, and products could be employed in the present invention on a once-through basis, it is often economically advantageous to recycle one or more of these materials; in the case of the catalyst system, this might require reconstituting one or more of the catalysts components to achieve the active catalyst system.

A particular advantage of the catalyst systems of the present invention is their stability, increased productivity and catalyst lifetimes compared to prior art catalysts without the donor groups of the catalysts of the present invention.

A further advantage of the catalyst systems of the present invention is their ability to be recycled.

Another embodiment of the present invention encompasses the use of components (a) (b) and optionally (c) in conjunction with one or more types of olefin polymerisation catalyst or catalyst system (d) to trimerise/teramerize olefins and subsequently incorporate a portion of the product(s) into a higher polymer.

Component (d) may be one or more suitable polymerisation catalyst(s) or catalyst system(s), examples of which include, but are not limited to, conventional Ziegler-Natta catalysts, metallocene catalysts, monocyclopentadienyl or "constrained geometry" catalysts, heat activated supported chromium oxide catalysts (eg. "Phillips"-type catalysts), late transition metal polymerisation catalysts (eg. diimine, diphosphine and salicylaldimine nickel/palladium catalysts, iron and cobalt pyridyldiimine catalysts and the like) and other so-called "single site catalysts" (SSC's).

Ziegler-Natta catalysts, in general, consist of two main components. One component is an alkyl or hydride of a Group I to III metal, most commonly $Al(Et)_3$ or $Al(iBu)_3$ or $Al(Et)_2Cl$ but also encompassing Grignard reagents, n-butyllithium, or dialkylzinc compounds. The second component is a salt of a Group IV to VIII transition metal, most commonly halides of titanium or vanadium such as $TiCl_4$, $TiCl_3$, $VCl_4$, or $VOCl_3$. The catalyst components when mixed, usually in a hydrocarbon solvent, may form a homogeneous or heterogeneous product. Such catalysts may be impregnated on a support, if desired, by means known to those skilled in the art and so used in any of the major processes known for co-ordination catalysis of polyolefins such as solution, slurry and gas-phase. In addition to the two major components described above, amounts of other compounds (typically electron donors) may be added to further modify the polymerization behaviour or activity of the catalyst.

Metallocene catalysts, in general, consist of transition metal complexes, most commonly based on Group IV metals, ligated with cyclopentadienyl(Cp)-type groups. A wide range of structures of this type of catalysts is known, including those with substituted, linked and/or heteroatom-containing Cp groups, Cp groups fused to other ring systems and the like. Additional activators, such as boranes or alumoxane, are often used and the catalysts may be supported, if desired.

Monocyclopentadienyl or "constrained geometry" catalysts, in general, consist of a transition metal complexes, most commonly based on Group IV metals, ligated with one cyclopentadienyl(Cp)-type group, often linked to additional donor group. A wide range of structures of this type of catalyst is known, including those with substituted linked and/or heteroatom-containing Cp groups, Cp groups fused to other ring systems and a range of linked and non-linked additional donor groups such as amides, amines and alkoxides. Additional activators, such as boranes or alumoxane, are often used and the catalysts may be supported, if desired.

A typical heat activated chromium oxide (Phillips) type catalyst employs a combination of a support material to which has first been added a chromium-containing material wherein at least part of the chromium is in the hexavalent state by heating in the presence of molecular oxygen. The support is generally composed of about 80 to 100 wt. % silica, the remainder, if any, being selected from the group consisting of refractory metal oxides, such as aluminium, boria, magnesia, thoria, zirconia, titania and mixtures of two or more of these refractory metal oxides. Supports can also comprise alumina, aluminium phosphate, boron phosphate and mixtures thereof with each other or with silica. The chromium compound is typically added to the support as a chromium (III) compound such as the acetate or acetylacetonate in order to avoid the toxicity of chromium (VI). The raw catalyst is then calcined in air at a temperature between 250 and 1000° C. for a period of from a few seconds to several hours. This converts at least part of the chromium to the hexavalent state. Reduction of the Cr (VI) to its active form normally occurs in the polymerization reaction, but can be done at the end of the calcination cycle with CO at about 350° C. Additional compounds, such as fluorine, aluminium and/or titanium may be added to the raw Phillips catalyst to modify it.

Late transition metal and single site catalysts cover a wide range of catalyst structures based on metals across the transition series (see, for example, Britovsek, G. J. P et al. *Angew. Chem. Int. Ed. Engl.* 1999, 38, 429. and Ittel, S. D. et al. *Chem. Rev.* 2000, 100, 1169.

Component (d) may also comprise one or more polymerisation catalysts or catalyst systems together with one or more additional oligomerisation catalysts or catalyst systems. Suitable oligomerisation catalysts include, but are not limited to, those that dimerise (for example, nickel phosphine dimerisation catalysts) or trimerise olefins or otherwise oligomerise olefins to, for example, a distribution of 1-olefins governed by a geometric series equation (for example, iron and cobalt pyridyldiimine oligomerisation catalysts).

Component (d) may independently be supported or unsupported. Where components (a) and (b) and optionally (c) are supported, (d) may be co-supported sequentially in any order or simultaneously on the same support or may be on a separate support. For some combinations, the components (a)-(c) may be part or all of component (d). For example, if component (d) is a heat activated chromium oxide catalyst then this may be (a), a chromium source and if component (d) contains an alumoxane activator then this may also be the optional activator (c).

The components (a), (b), (c) and (d) may be in any molar ratio. In the context of an integrated process the ratio of (a) to (d) is seen as particularly important. The ratio of (a) to (d) is preferably from 10000:1 to 1:10000 and more preferably from 100:1 to 11:100. The precise ratio required depends on the relative reactivity of the components and also on the desired properties of the product or catalyst systems.

A number of process options can be envisaged when using the catalysts of the present invention in an integrated process that includes a subsequent chemical transformation, i.e. with component (d) present. These options include "in series" processes in which the trimerisation and subsequent reaction are performed in separate, linked reactors, optionally with recycling of products/reagents between the reactors, and "in situ" processes in which a both reaction steps are carried out in the same reactor.

Chemical transformations involving olefins are well known to those skilled in the art: non-limiting examples of the chemical reactions that might be effected by use of a component (d) include polymerisation and co-polymerisation, oligomerisation, hydrogenation, hydroformylation, oxidation, hydration, sulfonation, epoxidation, isomerisation, amination, cyclisation, and alkylation. A typical reactor residence time in the polymerization reactor is less than 4 hours, preferably less than 3 hours.

In the case of an "in series" process various purification, analysis and control steps for the oligomeric product could potentially be incorporated between the trimerization and subsequent reaction stages. Recycling between reactors configured in series is also possible. An example of such a process would be the trimerisation of ethylene in a single reactor with a catalyst comprising components (a), (b) and optionally (c) followed by polymerisation of the trimerisation product with ethylene in a separate, linked reactor to give branched polyethylene. Another example would be co-trimerisation of ethylene and 1-butene and subsequent polymerisation of the trimerisation product to give poly(octene). Another example would be the trimerisation of an ethylene-containing waste stream from a polyethylene process, followed by introduction of the product 1-hexene back into the polyethylene process as a co-monomer for the production of branched polyethylene.

An example of an "in situ" process is the production of branched polyethylene catalysed by components (a), (b), (d) and optionally (c), added in any order such that the active catalytic species derived from components (a), (b) and optionally (c) is/are at some point present in a reactor with component (d)

Both the "in series and "in situ" approaches can be adaptions of current polymerisation technology for the process stages including component (d). All major olefin existing polymerisation processes, including multiple reactor processes, are considered adaptable to this approach. One adaption is the incorporation of a trimerisation catalyst bed into a recycle loop of a gas phase polymerisation process, this could be as a side or recycle stream within the main fluidisation recycle loop and or within the degassing recovery and recycle system.

Polymerisation conditions when component (d) is present can be, for example, solution phase, slurry phase, gas phase or bulk phase, with temperatures ranging from −100° C. to +300° C., and at pressures of atmospheric and above, particularly from 1.40 to 4100 41 barkPa. Reaction conditions, will typically have a significant impact upon the properties (e.g. density, melt index, yield) of the polymer being made and it is likely that the polymer requirements will dictate many of the reaction variables. Reaction temperature, particularly in processes where it is important to operate below the sintering temperature of the polymer, will typically, and preferably, be primarily selected to optimise the polymerisation reaction conditions. The high activity productivity, and activity kinetic profile characteristics, of this new trimerisation catalyst makes the 'in-situ' production of the comonomer, preferably hexene-1, during polymer, preferably polyethylene, production far more commercially attractive than prior art catalysts systems. This is true even at the typical reaction temperatures and pressures for the production of polyethylenes with high comonomer contents such as LLDPE, VLDPE and ULDPE (preferably between 50° C. and 100° C., depending upon the density of the polymer) and even when used in slurry and gas phase polymerisation processes (preferably total gas phase pressures between 15 and 30 bara and ethylene pressures between 10 and 70 percent of the gas phase). If desired, the catalyst can be used to polymerise ethylene under high pressure/high temperature process conditions wherein the polymeric material forms as a melt in supercritical ethylene. Preferably the polymerisation is conducted tinder gas phase fluidized bed or stirred bed conditions. Also, polymerisation or copolymerisation can be carried out in the presence of additives to control polymer or copolymer molecular weights. The use of hydrogen gas as a means of controlling the average molecular weight of the polymer or copolymer applies generally to the polymerization process of the present invention.

Slurry phase polymerisation conditions or gas phase polymerisation conditions are particularly useful for the production of high or low density grades of polyethylene, and polypropylene. In these processes the polymerisation conditions can be batch, continuous or semi-continuous. Furthermore, one or more reactors may be used, e.g. from two to five reactors in series. Different reaction conditions, such as different temperatures or hydrogen concentrations may be employed in the different reactors. In cascade operation the trimerisation catalyst may be added to any or all of the polymerisation reactors concerned. If added to the first reactor and carried through to subsequent reactors, the trimerisation catalyst may, or may not, be supplemented in subsequent reactors with fresh trimerisation or polymerisation catalyst, it may be deactivated in subsequent reactors through addition of reversible or irreversible poisons that partially or fully kill the trimerisation catalyst or though addition of additional polymerisation catalysts or modifiers that deactivate the trimerisation catalyst.

In the slurry phase process and the gas phase process, the catalyst is generally supported and metered and transferred into the polymerization zone in the form of a particulate solid either as a dry powder (e.g. with an inert gas, ethylene or an olefin) or as a slurry. In addition, an optional activator can be fed to the polymerisation zone, for example as a solution, separately from or together with the solid catalyst. Components (a)-(d) can be added to any part of the polymerisation reactor either on the same support particle or as a physical mixture on different support particles, or may be added separately to the same or different parts of the reactor sequentially in any order or simultaneously. Alternatively, (a)-(d) may be unsupported and independently added to any part of the polymerisation reactor simultaneously or sequentially together or separately. The ratio of the primary monomer to the other (co)monomers has a significant impact on the properties of the polymer formed (eg density) and it is usually desirable to be tightly controlled. This ratio may be primarily controlled by altering the concentration or partial pressure of either the primary monomer and/or the comonomer(s). Typically the primary monomer concentration will be controlled independently of the ratio to comonomers (for other reasons such as activity) and the primary monomer to comonomer ratio(s) may be controlled by varying the rate of introduction of trimerisation catalyst or by altering reaction conditions which preferentially impact the trimerisation reaction over the polymerisation reaction or which impacts upon the distribution of comonomers actually formed (eg by using reversible poisons/activators). Fresh comonomer feed may additionally be introduced to the polymerisation reactor to control the ratio. It may be desirable to preferentially purge certain (co)monomer(s) that are formed in the trimerisation reaction by, for example, heating or cooling a vapour (or liquid) slip (or recycle) stream within the polymerisation reaction (or degassing) systems. This may for example be optimised by controlling compressor knock-out or interstage conditions in recycle or degassing vent recovery compressors or by using dedicated condensing exchangers or distillation apparatus.

The rate of addition of each component may be independently controlled to allow variations in the ratio of components and the density of the polymer produced. Pressure, temperature, hydrogen addition, halogenated hydrocarbon addition, electron donor addition, activator/retarder addition and other suitable variables may also be varied to control the activity of each component and also allow control of the polymer produced.

Once the polymer product is discharged from the reactor, any associated and absorbed hydrocarbons are substantially removed, or degassed, from the polymer by, for example, pressure let-down or gas purging using fresh or recycled steam, nitrogen or light hydrocarbons (such as ethylene). Recovered gaseous or liquid hydrocarbons may be recycled to a purification system or the polymerisation zone.

In the slurry phase polymerisation process the polymerisation diluent is compatible with the polymer(s) and catalysts, and may be an alkane such as hexane, heptane, isobutane, or a mixture of hydrocarbons or paraffins. The polymerization zone can be, for example, an autoclave or similar reaction vessel, or a continuous liquid full loop reactor, e.g. of the type well-known in the manufacture of polyethylene by the Phillips Process. When the polymerisation process of the present invention is carried out under slurry conditions the polymerisation is preferably carried out at a temperature above 0° C., most preferably above 15° C. Under slurry conditions the polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerization in the presence of hydrogen gas which acts as chain transfer agent. Generally, the higher the concentration of hydrogen employed, the lower the average molecular weight of the produced polymer.

In bulk polymerisation processes, liquid monomer such as propylene is used as the polymerisation medium.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer (under conditions such that at least part of the monomer polymerises in contact with the catalyst in the bed. The bed is generally cooled by the addition of cool gas (e.g. recycled gaseous monomer) and/or volatile liquid (e.g. a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid in the polymerisation zone is small in relation to the quantity of polymer present. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn from the polymerisation zone with the produced polymer.

Methods for operating gas phase fluidized bed processes for making polyethylene, ethylene copolymers and polypropylene are well known in the art. The process can be operated, for example, in a vertical cylindrical reactor equipped with a perforated distribution plate to support the bed and to distribute the incoming fluidising gas stream through the bed. The fluidising gas circulating through the bed serves to remove the heat of polymerisation from the bed and to supply monomer for polymerization in the bed. Thus the fluidising gas generally comprises the monomer(s) normally together with some inert gas (e.g. nitrogen or inert hydrocarbons such as methane, ethane, propane, butane, pentane or hexane) and optionally with hydrogen as molecular weight modifier. The hot fluidising gas emerging from the top of the bed is led optionally through a velocity reduction zone (this can be a cylindrical portion of the reactor having a wider diameter) and, if desired, a cyclone and or filters to disentrain fine solid particles from the gas stream. The hot gas is then led to a heat exchanger to remove at least part of the heat of polymerisation. Catalysts are preferably fed continuously or at regular intervals to the bed. At start up of the process, the bed comprises fluidisable polymer which is preferably similar to the target polymer. Polymer is produced continuously within the bed by the polymerization of the monomer(s). Preferably means are provided to discharge polymer from the bed continuously or at regular intervals to maintain the fluidized bed at the desired height. The process is generally operated at relatively low pressure, for example, at 10 to 50 bars, and at temperatures for example, between 50 and 135° C. The temperature of the bed is maintained below the sintering temperature of the fluidized polymer to avoid problems of agglomeration.

In the gas phase fluidized bed process for polymerisation of olefins the heat evolved by the exothermic polymerisation reaction is normally removed from the polymerisation zone (i.e. the fluidised bed) by means of the fluidising gas stream as described above. The hot reactor gas emerging from the top of the bed is led through one or more heat exchangers wherein the gas is cooled. The cooled reactor gas, together with any make-up gas, is then recycled to the base of the bed. In the gas phase fluidised bed polymerisation process of the present invention it is desirable to provide additional cooling of the bed (and thereby improve the space time yield of the process) by feeding a volatile liquid to the bed under conditions such that the liquid evaporates in the bed thereby absorbing additional heat of polymerisation from the bed by the "latent heat of evaporation" effect. When the hot recycle gas from the bed enters the heat exchanger, the volatile liquid can condense out. In one embodiment of the present invention the volatile liquid is separated from the recycle gas and reintroduced separately into the bed. Thus, for example, the volatile liquid can be separated and sprayed into the bed. In another embodiment of the present invention the volatile liquid is recycled to the bed with the recycle gas. Thus the volatile liquid can be condensed from the fluidising gas stream emerging from the reactor and can be recycled to the bed with recycle gas, or can be separated from the recycle gas and then returned to the bed.

The method of condensing liquid in the recycle gas stream and returning the mixture of gas and entrained liquid to the bed is described in EP-A-0089691 and EP-A-0241947. It is preferred to reintroduce the condensed liquid into the bed separate from the recycle gas using the process described in our U.S. Pat. No. 5,541,270.

A number of process options can be envisaged when using the catalysts of the present invention in an integrated process to prepare higher polymers i.e when component (d) is present. These options include "in series" processes in which the trimerisation and subsequent polymerisation are carried in separate but linked reactors and "in situ" processes in which a both reaction steps are carried out in the same reactor.

In the case of a gas phase "in situ" polymerisation process, component (d) can, for example, be introduced into the polymerisation reaction zone in liquid form, for example, as a solution in a substantially inert liquid diluent. Components (a), (b), (c) and (d) may be independently added to any part of the polymerisation reactor simultaneously or sequentially together or separately. Under these circumstances it is preferred the liquid containing the component(s) is sprayed as fine droplets into the polymerisation zone. The droplet diameter is preferably within the range 1 to 1000 microns. EP-A-0593083 discloses a process for introducing a polymerisation catalyst into a gas phase polymerization. The methods disclosed in EP-A-0593083 can be suitably employed in the polymerisation process of the present invention if desired.

Although not usually required, upon completion of polymerisation or copolymerisation, or when it is desired to terminate polymerisation or copolymerisation or at least temporarily deactivate the catalyst or catalyst component of this invention, the catalyst can be contacted with water, alcohols, acetone, or other suitable catalyst deactivators a manner known to persons of skill in the art.

The trimerisation catalyst is preferably (but optionally) added before the polymerization catalyst such that the desired primary monomer to comonomer(s) ratio is established prior to introduction of the polymerization catalyst. The desired comonomer composition at start-up may however be achieved through introduction of fresh comonomer feed or through judicious initiation of the trimerisation reaction before or during polymerization catalyst introduction.

In the presence of component (d) the polymerisation process of the present invention provides polymers and copolymers, especially ethylene polymers, at high productivity (based on the amount of polymer or copolymer produced per unit weight of complex employed in the catalyst system). This means that relatively very small quantities of transition metal complexes are consumed in commercial processes using the process of the present invention. It also means that when the polymerisation process of the present invention can be operated under polymer recovery conditions that do not employ a catalyst separation step, thus leaving the catalyst, or residues thereof, in the polymer (e.g. as occurs in most commercial slurry and gas phase polymerization processes), the amount of transition metal complex in the produced polymer can be very small.

By varying the ratio of components (a) (b), optionally (c) and (d) and/or by adding additional comonomers, catalysts of the present invention can provide a wide variety of branched polymers differing in density and in other important physical properties.

The present invention will now be further described by reference to the accompanying examples:

EXAMPLES

General Considerations

All air- and moisture-sensitive compounds were manipulated using standard vacuum line, Schlenk, or cannula techniques or in a glovebox under a nitrogen atmosphere. All gases were purified by passage over MnO on vermiculite and activated molecular sieves. Ethereal solvents were stored over sodium benzophenone ketyl, and halogenated solvents were dried over calcium hydride. Dichloromethane-$d_2$, toluene-$d_8$, and chloroform-d were purchased from Aldrich and dried under vacuum at 100° C. for 24 hours. Other materials were used as received. Amine starting materials, MAO (10% wt. in toluene), chlorodiphenylphosphine and $(THF)_3CrCl_3$ were purchased from Aldrich.

Instrumentation $^1H$ and $^{31}P$ NMR spectra were recorded on a Varian Mercury 300 spectrometer at 299.868 MHz and 121.389 MHz respectively, at room temperature. $^2H$ NMR spectra were recorded on a Varian INOVA 500 spectrometer at 499.852 MHz at indicated temperatures. All $^1H$ NMR chemical shifts are reported relative to TMS, and $^1H$ (residual) chemical shifts of the solvent are used as secondary standard. $^{31}P$ NMR chemical shifts are reported relative to an external $H_3PO_4$ standard. GC measurements were taken on an Agilent 6890 Series GC using an Agilent HP-5 column. X-ray crystallography was carried out using an Enraf-Nonius CAD-4 diffractometer.

Example 1

(a) Synthesis of $(C_6H_5)_2PN(CH_2CH_2OCH_3)P(C_6H_5)_2$

Chlorodiphenylphosphine (4.5 mL, 24 mmol, 2.3 equiv.) was dissolved in dry toluene (150 mL). Under an atmosphere of argon, an excess of triethylamine (5.0 mL, 36 mmol) was syringed into the reaction flask, which was stirred for 5 minutes. 2-Methoxyethylamine (0.9 mL, 10 mmol) was then syringed dropwise under argon. A precipitate immediately formed. The reaction mixture was then allowed to stir for 36 hrs at 110° C. The ammonium salt was filtered off and the solvent and the excess triethylamine and diphenylphosphine were removed in vacuo to leave a yellow residue. The residue was passed through a silica gel plug using a $CH_2Cl_2$ (15%)/petroleum ether (85%) mixture as the eluent. Removing the solvent afforded 2.905 g of a fine white powder in 63% yield. $^1H$ NMR (RT, 300 MHz, CDCl$_3$): δ=2.90 (2H, t, $J_{HH}$=7.4 Hz, CH$_2$O), 3.02 (3H, s, OCH$_3$), 3.47 (2H, m, CH$_2$), 7.29-7.44 (20H, m, ArH). $^{31}P$ NMR (RT, 121 MHz, CDCl$_3$): δ=64.6 ppm (s). MS (FAB+): 444 (M+H).

(b) Synthesis of $\{[(C_6H_5)_2PN(CH_2CH_2OCH_3)P(C_6H_5)_2]CrCl_3\}_2$

In the glovebox, $(C_6H_5)_2PN(CH_2CH_2OCH_3)P(C_6H_5)_2$ (0.335 g, 0.7554 mmol) was dissolved in CH$_2$Cl$_2$ (3 mL). $(THF)_3CrCl_3$ (0.283 g, 0.7554 mmol) was dissolved in CH$_2$Cl$_2$ (7 mL) in a separate vial. The chromium starting material solution was slowly added to the stirring solution of the ligand. The mixture, which immediately turned blue, was allowed to react for one hour after which the solvent was pumped off. The residue was triturated twice with CH$_2$Cl$_2$. The remaining solid was recrystallized from CH$_2$Cl$_2$/Petroleum ether to give 0.344 g of a bright blue/violet powder in 76% yield. X-ray quality crystals were grown from layering petroleum ether over a saturated CH$_2$Cl$_2$ solution of the complex. Crystallographic data: monoclinic, space group P2(1)/n, a=11.3619(16), b=18.5923(33), c=16.7414(37) Å, V=3350.62 Å$^3$, T=−173° C., μ=1.17 mm$^{-1}$. 6153 unique reflections, $R_{int}$=0.0457, $R_1$=0.0947, $wR_2$=0.1063.

Example 2

(a) Synthesis of $(C_6H_5)_2PN(CH_2CH_2CH_2OCH_3)P(C_6H_5)_2$

Chlorodiphenylphosphine (4.9 mL, 26 mmol, 2.5 equiv.) was dissolved in dry toluene (150 mL). Under an atmosphere of argon, an excess of triethylamine (8.0 mL, 58 mmol) was syringed into the reaction flask, which was stirred for 5 minutes. 3-Methoxypropylamine (1.1 mL, 11 mmol) was then syringed dropwise under argon. A precipitate immediately formed. The reaction mixture was then allowed to stir for 36 hrs at 110° C. The ammonium salt was filtered off and the solvent and the excess triethylamine and diphenylphosphine were removed in vacuo to leave a yellowish residue. The residue was passed through a silica gel plug using a CH$_2$Cl$_2$/petroleum ether (1:1) mixture as the eluent. Removing the solvent and triturating with petroleum ether afforded 3.564 g of a fine white powder in 75% yield. $^1H$ NMR (RT, 300 MHz, CDCl$_3$): δ=1.39 (2H, br tt, $J_{HH}$=8.1 Hz, $J_{HH}$=6.3 Hz, CH$_2$), 3.03 (2H, t, $J_{HH}$=6.3 Hz, CH$_2$O), 3.10 (3H, s, OCH$_3$), 3.27-3.44 (2H, m, NCH$_2$), 7.28-7.46 (20H, m, ArH). $^{31}P$ NMR (RT, 121 MHz, CDCl$_3$): δ=63.1 ppm (s). MS (FAB+): 458 (M+H).

(b) Synthesis of $\{[(C_6H_5)_2PN(CH_2CH_2CH_2OCH_3)P(C_6H_5)_2]CrCl_3\}$

In the glovebox, $(C_6H_5)_2PN(CH_2CH_2CH_2OCH_3)P(C_6H_5)_2$ (0.494 g, 1.080 mmol) was dissolved in CH$_2$Cl$_2$ (3 mL). $(THF)CrCl_3$ (0.405 g, 1.080 mmol) was dissolved in CH$_2$Cl$_2$ (7 mL) in a separate vial. The chromium starting material solution was slowly added to the stirring solution of the ligand. The mixture turned blue after 5 minutes and was allowed to react for one hour after which the solvent was pumped off. The residue was triturated twice with CH$_2$Cl$_2$. The remaining solid was recrystallized from CH$_2$Cl$_2$/Petroleum ether to give 0.599 g of a dark blue powder in 90% yield.

Example 3

(a) Synthesis of $(C_6H_5)_2PN((2-OCH_3)C_6H_4)P(C_6H_5)_2$

Chlorodiphenylphosphine (5.8 mL, 31 mmol, 2.3 equiv.) was dissolved in dry THF (150 mL). Under an atmosphere of argon, an excess of triethylamine (9.0 mL, 65 mmol) was syringed into the reaction flask, which was stirred for 5 minutes. o-Anisidine (1.5 mL, 14 mmol) was then syringed dropwise under argon. A precipitate immediately formed and the mixture turns deep yellow. The reaction mixture was then allowed to stir for 24 hrs at 62° C. The reaction can only afford about 75% conversion (longer reaction times do not increase conversion). The solvent and the excess trimethylamine and diphenylphosphine were removed in vacuo. The yellow residue was dissolved in $CH_2Cl_2$ and extracted with 10% NaOH. The organic fraction was dried over $MgSO_4$ and the solvent removed after filtration, which afforded a yellow oil. After dissolving the oil in a minimum amount of $CH_2Cl_2$, petroleum ether was added and a white powder crashed out at room temperature to give 4.642 g of the desired compound in 70% yield. $^1$H NMR (RT, 300 MHz, $CDCl_3$): δ=3.29 (3H, s, $OCH_3$), 6.79-6.71 (1H, m, Ar21), 7.01-7.11 (1H, m, ArH), 7.16-7.51 (20H, m, ArH), 7.55-7.65 (1H, m, ArH), 7.73-7.83 (1H, m, ArH). $^{31}$P NMR (RT, 121 MHz, $CDCl_3$): δ=65.5 ppm (s). MS (FAB+): 491 (M+H).

(b) Synthesis of $\{[(C_6H_5)_2PN((2-OCH_3)C_6H_4)P(C_6H_5)_2]CrCl_3\}$

In the glovebox, $(C_6H_5)_2PN((2-OCH_3)C_6H_4)P(C_6H_5)_2$ (0.364 g, 0.741 mmol) was dissolved in $CH_2Cl_2$ (3 mL). $(THF)CrCl_3$ (0.278 g, 0.741 mmol) was dissolved in $CH_2Cl_2$ (7 mL) in a separate vial. The chromium starting material solution was slowly added to the stirring solution of the ligand. The mixture turned deep green after 5 minutes and was allowed to react for one hour after which the solvent was pumped off. The residue was triturated twice with $CH_2Cl_2$. The remaining solid was recrystallized from $CH_2Cl_2$/Petroleum ether to give 0.119 g of a dark blue powder in 25% yield.

Example 4

(a) Synthesis of $(C_6H_5)_2PN(CH_2(2-OCH_3)C_6H_4)P(C_6H_5)_2$

Chlorodiphenylphosphine (4.6 mL, 24.7 mmol, 2.5 equiv.) was dissolved in dry $CH_2Cl_2$ (150 mL). Under an atmosphere of argon, an excess of triethylamine (7.0 mL, 50.6 mmol) was syringed into the reaction flask, which was stirred for 5 minutes. 2-methoxybenzylamine (1.3 mL, 9.9 mmol) was then syringed dropwise under argon. A precipitate immediately formed and the mixture turns deep yellow. The reaction mixture was then allowed to stir for 14 hrs at 37° C. The solvent and the excess trimethylamine and diphenylphosphine were removed in vacuo. The yellow residue was dissolved in $CH_2Cl_2$ and extracted with 10% NaOH. The organic fraction was dried over $MgSO_4$ and the solvent removed after filtration, which afforded an off-white solid. After dissolving the solid in a minimum amount of $CH_2Cl_2$, acetonitrile was added and a white powder crashed out at room temperature to give 3.366 g of the desired compound in 67% yield. $^1$H NMR (RT, 300 MHz, $CDCl_3$): δ=3.70 (3H, s, $OCH_3$), 4.47 (2H, t, $J_{HP}$=9.2 Hz, $CH_2$), 6.66-6.84 (3H, m, $NCH_2$ArH), 7.09-7.18 (1H, m, $NCH_2$ArH), 7.22-7.32 (12H, m, ArH), 7.35-7.44 (8H, m, ArH). 31p NMR (RT, 121 MHz, $CDCl_3$): δ=59.94 ppm (s). MS (Direct Insertion Probe EI): 505.17.

(b) Synthesis of $\{[(C_6H_5)_2PN(CH_2(2-OCH_3)C_6H_4)P(C_6H_5)_2]CrCl_3\}_2$

In the glovebox, $(C_6H_5)_2PN(CH_2(2-OCH_3)C_6H_4)P(C_6H_5)_2$ (0.547 g, 1.08 mmol) was dissolved in $CH_2Cl_2$ (3 mL). $(THF)_3CrCl_3$ (0.405 g, 1.08 mmol) was dissolved in $CH_2Cl_2$ (7 mL) in a separate vial. The chromium starting material solution was slowly added to the stirring solution of the ligand. The mixture, which immediately turned blue, was allowed to react for one hour after which the solvent was pumped off. The residue was triturated twice with $CH_2Cl_2$. The remaining solid was recrystallized from $CH_2Cl_2$/Petroleum ether to give 0.621 g in two batches of a bright blue/violet powder in 86% yield. X-ray quality crystals were grown from layering petroleum ether over a saturated $CH_2Cl_2$ solution of the complex. Crystallographic data: monoclinic, space group P2(1)/n, a=13.3428(24), b=21.4846(39), c=14.2288(26) Å, V=3740.96 Å$^3$, T=−173° C., μ=0.79 mm$^{-1}$, 4927 unique reflections, $R_{int}$=0.1908, $R_1$=0.1616, $wR_2$=0.1330.

Example 5

Comparative (a) Synthesis of $(C_6H_5)_2PN(CH(CH_3)_2)P(C_6H_5)_2$

Chlorodiphenylphosphine (4.0 mL, 21.5 mmol, 2.3 equiv.) was dissolved in dry $CH_2Cl_2$ (100 mL). Under an atmosphere of argon, an excess of triethylamine (5.5 mL, 39.8 mmol) was syringed into the reaction flask, which was stirred for 5 minutes. Isopropyl amine (0.8 mL, 9.4 mmol) was then syringed dropwise under argon. A precipitate immediately formed and the mixture turns deep yellow. The reaction mixture was then allowed to stir for 14 hrs at 37° C. The solvent and the excess trimethylamine and diphenylphosphine were removed in vacuo. The yellow residue was dissolved in $Et_2O$ and extracted with 1 M NaOH. The organic fraction was dried over $MgSO_4$ and the solvent removed after filtration, which afforded an off-white oil. After dissolving the oil in a minimum amount of $CH_2Cl_2$, acetonitrile was added and a white powder crashed out at room temperature to give 2.823 g of the desired compound in 71% yield. $^1$H NMR (RT, 300 MHz, $CDCl_3$): δ=1.15 (6H, d, $J_{HH}$=6.6 Hz, $CH_3$), 3.76 (1H, m, $CMe_2H$), 7.27-7.42 (20H, m, ArH). $^{31}$P NMR (RT, 121 MHz, $CDCl_3$): δ=49.40 ppm (s).

(b) Synthesis of $\{[(C_6H_5)_2PN(CH(CH_3)_2)P(C_6H_5)_2]CrCl_3\}_2$

In the glovebox, $(C_6H_5)_2PN(CH(CH_3)_2)P(C_6H_5)_2$ (0.462 g, 1.08 mmol) was dissolved in $CH_2Cl_2$ (3 mL). $(THF)_3CrCl_3$ (0.405 g, 1.08 mmol) was dissolved in $CH_2Cl_2$ (7 mL) in a separate vial. The chromium starting material solution was slowly added to the stirring solution of the ligand. The mixture, which immediately turned blue, was allowed to react for one hour after which the solvent was pumped off. The residue was triturated twice with $CH_2Cl_2$. The remaining solid was recrystallized from $CH_2Cl_2$/Petroleum ether to give 0.530 g in two batches of a bright blue/violet powder in 84% yield.

Example 6

Reaction of Precatalysts with MAO and Ethylene (a) At 1 atm Ethylene Pressure

In the glove box, a 250 mL round bottom flask was charged with the precatalyst (0.020 mmol, 1 equiv.) in 50 mL of PhCl to give a pale bluish-purple solution. The flask was equipped with a 180° needle valve, fully degassed on the vacuum line at −78° C. The system was allowed to warm up to 0° C. and was backfilled with 1 atmosphere of ethylene. With a positive pressure of ethylene, the valve was replaced with a septum and MAO (3.2 mL, 300 equiv.) was syringed in as a toluene solution at 0° C. The mixture immediately turned green upon addition. The ice bath was then replaced with a 20° C. bath. Ethylene consumption was monitored using a mercury manometer. After the indicated reaction time, the mixture was quenched with HCl/MeOH. An aliquot of the organic fraction was separated and filtered through a plug of activated alumina to remove any chromium. This mixture was analyzed by GC and GC-MS. All identified products were quantified by comparison to a mesitylene standard, which was added to the reaction mixture. The reaction mixture was then filtered and any solid was washed with HCl/MeOH and dried in an oven for 15 hours.

(b) At 4 atm Ethylene Pressure

In the glovebox, a 250 mL high pressure glass vessel was charged with the precatalyst (0.020 mmol, 1 equiv.) in 50 mL of PhCl to give a pale bluish-purple solution. The vessel was equipped with a regulator and placed on the high pressure setup. Ethylene (4 atm) was purged through the system after which MAO (3.2 mL, 300 equiv.) was added via syringe. The mixture immediately turned green upon addition. The pressure was kept constant during the reaction (90 min), after which the system was vented and the reaction mixture quenched with HCl/MeOH. An aliquot of the organic fraction was separated and filtered through a plug of activated alumina to remove any chromium. This mixture was analyzed by GC and GC-MS. All identified products were quantified by comparison to a mesitylene standard, which was added to the reaction mixture. The reaction mixture was then filtered and any solid was washed with HCl/MeOH and dried in an oven for 15 hours.

TABLE 1

| Precatalyst | C2 pressure | Prod TON | PE TON | 1-C6 TON | 1-C8 TON | Ratio [1-C8]/[1-C6] |
|---|---|---|---|---|---|---|
| Example 1 | 1 atm | 670 | 43 | 106 | 51 | 0.485 |
| Example 2 | 1 atm | 3966 | 13 | 688 | 225 | 0.328 |
| Example 3 | 1 atm | 1720 | 5 | 343 | 112 | 0.327 |
| Example 4 | 1 atm | 3019 | 2 | 575 | 171 | 0.297 |
| Example 5 | 1 atm | 2586 | 23 | 596 | 99 | 0.166 |
| Example 4 | 4 atm | 21932 | 85 | 2847 | 1665 | 0.585 |
| Example 5 | 4 atm | 14911 | 60 | 2349 | 976 | 0.416 |

Table 1 shows the improved productivity for catalysts from examples 2 and 4 and the increased ratio of C8 versus C6 products for catalysts from examples 1-4 compared with the comparative example 5.

Example 7

Reaction of Precatalyst from Examples 4 and 5 with MAO and Ethylene at 1 atm Ethylene Pressure Over a Period of 25 h In the glove box, a 250 mL round bottom flask was charged with the precatalyst (0.020 mmol, 1 equiv.) in 50 mL of PhCl to give a pale bluish-purple solution. The flask was equipped with a 180° needle valve, fully degassed on the vacuum line at −78° C. The system was allowed to warm up to 20° C. and was backfilled with 1 atmosphere of ethylene. With a positive pressure of ethylene, the valve was replaced with a septum and MAO (3.2 mL, 300 equiv.) was syringed in as a toluene solution. The mixture immediately turned green upon addition. Ethylene consumption was monitored using a mercury manometer. After the indicated reaction time (25 hrs), the mixture was quenched with HCl/MeOH. An aliquot of the organic fraction was separated and filtered through a plug of activated alumina to remove any chromium. This mixture was analyzed by GC and GC-MS. All identified products were quantified by comparison to a mesitylene standard, which was added to the reaction mixture. The reaction mixture was then filtered and any solid was washed with HCl/MeOH and dried in an oven for 15 hours.

FIG. 1 and Table 2 show the improved catalyst stability and increased productivity of the preferred catalyst from example 4 compared to the catalyst from example 5.

TABLE 2

| Precatalyst | C2 pressure | Prod TON | PE TON | 1-C6 TON | 1-C8 TON | Ratio [1-C8]/[1-C6] |
|---|---|---|---|---|---|---|
| Ex 4 | 1 atm | 11595 | 27 | 1598 | 337 | 0.211 |
| Ex 5 | 1 atm | 4905 | 43 | 797 | 183 | 0.230 |

Example 8

Reaction of Precatalyst from Examples 4 and 5 with MAO and Ethylene (a) In Toluene Solvent at 4 atm Ethylene Pressure In the glovebox, a 225 mL high pressure glass vessel was charged with the precatalyst (0.020 mmol, 1 equiv.) in 50 mL of toluene to give a pale bluish-purple solution. The vessel was equipped with a regulator and placed on the high pressure setup. Ethylene (4 atm) was purged through the system after which MAO (3.2 mL. 300 equiv.) was added via syringe. The mixture immediately turned green upon addition. The pressure was kept constant during the reaction (90 min), after which the system was vented and the reaction mixture quenched with HCl/MeOH. An aliquot of the organic fraction was separated and filtered through a plug of activated alumina to remove any chromium. This mixture was analyzed by GC and GC-MS. All identified products were quantified by comparison to a mesitylene standard, which was added to the reaction mixture. The reaction mixture was then filtered and any solid was washed with HCl/MeOH and dried in an oven for 15 hours.

(b) In Chlorobenzene Solvent at 4 atm Ethylene Pressure

In the glovebox, a 225 mL high pressure glass vessel was charged with the precatalyst (0.020 mmol, 1 equiv.) in 50 mL of PhCl to give a pale bluish-purple solution. The vessel was equipped with a regulator and placed on the high pressure setup. Ethylene (4 atm) was purged through the system after which MAO (3.2 mL, 300 equiv.) was added via syringe. The mixture immediately turned green upon addition. The pressure was kept constant during the reaction (90 min), after which the system was vented and the reaction mixture quenched with HCl/MeOH. An aliquot of the organic fraction was separated and filtered through a plug of activated alumina to remove any chromium. This mixture was analyzed by GC and GC-MS. All identified products were quantified by comparison to a mesitylene standard, which was added to the reaction mixture. The reaction mixture was then filtered and any solid was washed with HCl/MeOH and dried in an oven for 15 hours.

Table 3 shows the improved catalyst productivity and reduced poly-ethylene formation when the reaction is carried out in chlorobenzene.

TABLE 3

| Pre-cat | Solvent | Prod TON | PE TON | C6 [wt %] | 1-C6 [wt %] | C8 [wt %] | 1-C8 [wt %] | >C8 [wt %] | Ratio [1-C8]/[1-C6] |
|---|---|---|---|---|---|---|---|---|---|
| Ex 4 | PhCl | 21932 | 85 | 54 | 90 | 31 | 93 | 15 | 0.585 |
| Ex 4 | toluene | 1648 | 617 | 39 | 70 | 58 | 95 | 2 | 2.01 |
| Ex 5 | PhCl | 14911 | 60 | 60 | 96 | 28 | 92 | 14 | 0.416 |
| Ex 5 | toluene | 2380 | 91 | 44 | 89 | 53 | 99 | 3 | 1.33 |

Example 9

General Procedure (Runs 1-4)

In a glovebox a 225 ml high-pressure glass vessel was charged with the precatalyst from Example 4 (0.020 mmol, 1 equiv) in 50 ml of PhCl to give a pale bluish-purple solution. The vessel was equipped with a regulator and placed on the high pressure setup. Ethylene was purged through the system after which MAO (10 wt % in toluene, 3.2 ml, 300 equiv) was added via syringe. The mixture immediately turned green upon addition. Ethylene pressure was kept constant during the reaction (25° C., 90 min) after which the system was vented and the reaction mixture quenched with HCL/MeOH. An aliquot of the organic fraction was separated and filtered through a plug of activated alumina to remove any chromium. This mixture was analysed by GC and GC-MS. All identified products were quantified by comparison to a mesitylene standard which was added to the reaction mixture. The reaction mixture was then filtered and any solid was washed with HCL/MeOH and dried under vacuum for 15 hr and weighed.

Run 5

The procedure was the same as above however a 85 ml, high-pressure glass vessel was employed for the reaction and 0.008 mmol of the precatalyst from Example 4, 20 ml of PhCl and 1.3 ml of MAO (10 wt % solution in toluene, 300 equiv) were used.

Results of the polymerization are shown in Table 4 below. The Table shows that as the ethylene pressure is increased the production of 1-octene is favoured over 1-hexene, production.

TABLE 4

| Run | Pressure (atm) | Productivity $g_{product}/g_{chromium}$ | PE (wt %) | C6* (wt %) | C8 (wt %) | C10 (wt %) | C12 (wt %) | >C12 (wt %) | 1-C6 in C6 (%) | 1-C8 in C8 (%) |
|---|---|---|---|---|---|---|---|---|---|---|
| 1 | 1 | 1625 | <0.1 | 62 | 24 | 7 | 5 | 1 | 93 | 93 |
| 2 | 2.4 | 3911 | 0.6 | 57 | 28 | 6 | 6 | 2 | 92 | 94 |
| 3 | 4.1 | 11684 | 0.4 | 44 | 33 | 7 | 11 | 5 | 90 | 92 |
| 4 | 6.1 | 14584 | 0.2 | 41 | 38 | 6 | 10 | 5 | 87 | 95 |
| 5 | 8.4 | 42408 | 0.2 | 30 | 34 | 8 | 17 | 12 | 83 | 93 |

*in the C6 fraction hexene isomers appears as 0–0.3 wt %

We claim:

1. A catalyst system for the selective trimerisation or tetramerisation of olefins comprising
   (a) a source of a Group 3 to 10 transition metal,
   (b) a ligand having the formula:

$R^1R^2X-Y-XR^3R^4$ wherein
   X is phosphorus, arsenic or antimony,
   Y is a bridging group having the formula:

$Z-(A)-D-R_m$ wherein
   Z is methylene, 1,2-ethane, 1,2-phenylene, 1,3-propane, 1,2 catechol or nitrogen,
   A is a linear or cyclic hydrocarbyl, substituted hydrocarbyl, heterohydrocarbyl or substituted heterohydrocarbyl linking group wherein the number of atoms directly linking Z to D is 1, 2 or 3,
   D is N, P, As, O, S or Se,
   R is hydrogen, alkyl, hydrocarbyl, substituted hydrocarbyl, heteroalkyl, heterohydrocarbyl or substituted heterohydrocarbyl, and
   m is 1 or 2,
   $R^1$, $R^2$, $R^3$, and $R^4$ are the same or different and represent hydrocarbyl or functionalized hydrocarbyl moieties with the proviso that if D is nitrogen, R is not a cyclic ether, and optionally
   (c) an activator.

2. A catalyst system according to claim 1 wherein the Group 3 to 10 transition metal is a Group 6 transition metal.

3. A catalyst system according to claim 1 wherein the transition metal is chromium.

4. A catalyst system according to claim 1 wherein X is phosphorus.

5. A catalyst system according to claim 1 wherein D is oxygen.

6. A catalyst system according to claim 1 wherein $R^1$, $R^2$, $R^3$, and $R^4$ are phenyl.

7. A catalyst system according to claim 1 wherein Y is

—N—(CH$_2$)$_2$OCH$_3$,

—N—(CH$_2$)$_3$OCH$_3$,

—N—(2-OCH$_3$)C$_6$H$_4$ or

—N—CH$_2$(2-OCH$_3$)C$_6$H$_4$.

8. A catalyst system according to claim 1 wherein component (b) is selected from the following (C$_6$H$_5$)$_2$PN(CH$_2$CH$_2$OCH$_3$)P(C$_6$H$_5$)$_2$, (C$_6$H$_5$)$_2$PN(CH$_2$CH$_2$CH$_2$OCH$_3$)P(C$_6$H$_5$)$_2$, (C$_6$H$_5$)$_2$PN((2-OCH$_3$)C$_6$H$_4$)P(C$_6$H$_5$)$_2$ and (C$_6$H$_5$)$_2$PN(CH$_2$(2-OCH$_3$)C$_6$H$_4$)P(C$_6$H$_5$)$_2$.

9. A catalyst system according to claim 1 wherein the ratio of components (a) and (b) is between 10000:1 and 1:10000.

10. A catalyst system according to claim 9 wherein the ratio of components (a) and (b) is between 1.5:1 and 1:1.5.

11. A catalyst system according to claim 1 wherein the activator is an aluminoxane.

12. A catalyst system according to claim 1 wherein any of the components (a), (b) or (c) are supported.

13. A catalyst system according to claim 12 wherein the support is silica.

14. A catalyst for the trimerization/tetramerization and polymerization of olefins according to claim 1 further comprising one or more catalysts (d) suitable for the polymerization, oligomerization or other chemical transformation of olefins.

15. A catalyst according to claim 14 wherein catalyst (d) is selected from the group consisting of Ziegler-Natta catalysts, metallocene catalysts, chromium catalysts, late transition metal catalysts and single site catalysts.

16. A process for the trimerization or tetramerization of olefin monomer or olefin monomers performed in the presence of a catalyst system according to claim 1.

17. A process according to claim 16 wherein the olefin monomer is ethylene.

18. A process according to claim 16 performed in the solution, slurry or gas phase.

19. A process according to claim 16 performed in the presence of an inert diluent or solvent.

20. A process according to claim 19 wherein the inert diluent or solvent is heptane, toluene, 1-hexene, diethyl ether, tetrahydrofuran, acetonitrile, dichloromethane, chloroform, chlorobenzene or methanol.

21. A process according to claim 16 wherein the inert diluent or solvent is a halogen-containing compound.

22. A process according to claim 21 wherein the halogen-containing compound is chlorobenzene or 1,2-dichlorobenzene.

23. A process according to claim 16 wherein the olefin monomer or olefin monomers are additionally contacted with a further catalyst (d) suitable for the polymerization, oligomerization or other chemical transformation of olefins.

24. A process according to claim 23 wherein the catalyst (d) is selected from the group consisting of Ziegler-Natta catalysts, metallocene catalysts, monocyclopentadienyl or "constrained geometry" catalysts, heat activated supported chromium oxide catalysts, late transition metal catalysts and single site catalysts.

25. A process according to claim 23 wherein the ratio of components (a) to (d) is in the range 10000:1 to 1:10000.

26. A process according to claim 25 wherein the ratio of components (a) to (d) is from 100:1 to 1:100.

* * * * *